United States Patent [19]

Owens et al.

[11] Patent Number: 5,247,873
[45] Date of Patent: Sep. 28, 1993

[54] CONNECTING ROD ASSEMBLY WITH A CROSSHEAD

[75] Inventors: John H. Owens; Joseph Spector, both of Quincy, Ill.

[73] Assignee: Cooper Industries, Inc., Houston, Tex.

[21] Appl. No.: 826,715

[22] Filed: Jan. 28, 1992

[51] Int. Cl.⁵ .............................................. F01B 31/10
[52] U.S. Cl. ...................... 92/157; 92/165 R; 92/187; 384/11; 384/206; 74/44; 403/135
[58] Field of Search .............. 92/139, 152, 157, 165 R, 92/187, 188, 186; 384/206, 208, 209, 213, 11; 74/44; 403/122, 135, 143

[56] References Cited

U.S. PATENT DOCUMENTS

| | | | |
|---|---|---|---|
| 1,284,300 | 11/1918 | Fuchs, Jr. | 403/143 |
| 1,350,747 | 8/1919 | Stenger . | |
| 1,456,727 | 3/1922 | Franchi . | |
| 1,637,765 | 8/1927 | Comstock | 92/157 |
| 1,784,837 | 12/1930 | Hiatt | 403/143 |
| 1,796,009 | 3/1931 | Dunn | 403/135 |
| 1,899,355 | 2/1933 | Reid | 92/157 |
| 2,178,484 | 10/1939 | Longley | 403/122 |
| 2,671,704 | 3/1954 | Brown | 403/143 |
| 2,823,085 | 1/1955 | Keylwert . | |
| 3,163,474 | 12/1964 | Wilson | 384/206 |
| 4,459,900 | 7/1981 | LaBouff . | |
| 4,872,395 | 10/1989 | Bennitt et al. | 92/165 R |
| 4,938,121 | 2/1988 | Melchior . | |

FOREIGN PATENT DOCUMENTS

| 21924 | 11/1901 | United Kingdom | 384/291 |
|---|---|---|---|
| 430191 | 6/1935 | United Kingdom | 384/291 |

Primary Examiner—Thomas E. Denion
Attorney, Agent, or Firm—William B. Patterson; Eddie E. Scott; Alan R. Thiele

[57] ABSTRACT

A spherical joint and bearing assembly utilizes a ball and socket arrangement between a connecting rod and a crosshead in a power reciprocating fluid pump. The connecting rod is spherically shaped and is held in a thrust bearing having a matching interior surface. A split retraction ring is held between the rear portion of the sphere and a shoulder in the crosshead. The result is an increased bearing surface and reduction in misalignment.

2 Claims, 3 Drawing Sheets

CONNECTING ROD ASSEMBLY WITH A CROSSHEAD

BACKGROUND OF THE INVENTION

The present invention relates to power pumps; more specifically, the present invention relates to a spherical joint and bearing assembly between the connecting rod and the crosshead in a single acting, reciprocating power pump.

The power pumps to which this invention is directed are reciprocating pumps driven by power from an outside source like a diesel engine. The pump typically consists of a fluid end and a power end. The fluid end imports and pressurizes the fluid before it is expelled. The power end includes a crank shaft which transmits power and motion to a connecting rod which articulates the motion of the crank shaft to a crosshead. The crosshead, like a piston, creates a linear reciprocating motion derived from the crank shaft rotary motion through the connecting rod. The reciprocating motion of the crosshead is typically applied to a plunger and the plunger compresses fluid in the fluid end of the pump during the thrust portion of the pump cycle. To reduce wear, heat and friction, bearings are employed at each end of the connecting rod. For example, in current designs a cylindrical crank pin bearing is used between the crank shaft and the connecting rod to transmit the rotary load to the connecting rod. Similarly, a cylindrical wrist pin bearing is employed between the wrist pin and the connecting rod to transmit reciprocating load to the crosshead.

Bearing wear accounts for most down time and repairs of fluid reciprocating pumps. Specifically, the wrist pin bearing between the connecting rod and the wrist pin becomes worn and deformed from the load transmitted during the thrust stroke of the pump when the plunger and crosshead are acting against high pressure fluid being pumped through the fluid end of the pump. As the wrist pin bearing wears, it creates "slop" between the connecting rod and the crosshead causing the pump to knock as it operates. Increasing the bearing size and surface results in longer bearing life. However, the result is an unacceptable increase in pump size and weight.

An additional problem with prior art bearing arrangements is misalignment. Misalignment occurs when the crank shaft and the wrist pin or knuckle bearings are not perfectly parallel. Misalignment causes the bearings to wear on one side rather than evenly. This uneven wear results in a further reduction of bearing life.

There is therefore, a need for a bearing arrangement wherein the bearing surface is increased without increasing the diameter of the pump parts.

There is a further need therefore, for a bearing arrangement which will transmit force more evenly over the surface of the bearing, thus reducing bearing wear.

There is yet a further need for a bearing arrangement which is self-aligning and will reduce uneven bearing wear.

SUMMARY OF THE INVENTION

The spherical joint and bearing assembly of the present invention increases the bearing surface and transmits force more evenly while being self-aligning. A ball and socket arrangement between a connecting rod and a crosshead in a power reciprocating fluid pump forms the heart of the present invention. The connecting rod is spherically shaped at the crosshead end and is held in a thrust bearing having a correspondingly spherical interior surface. The exterior surface of the thrust bearing corresponds to the interior surface of the crosshead allowing the thrust bearing to be held within the crosshead. A split retraction bearing ring is held between the rear portion of the sphere and a shoulder in the crosshead. A crosshead extension holds the bearings within the crosshead. The result is a bearing surface between a connecting rod and a crosshead which provides increased bearing surface and avoids uneven wear through misalignment.

DESCRIPTION OF A PREFERRED EMBODIMENT

Figure 1:
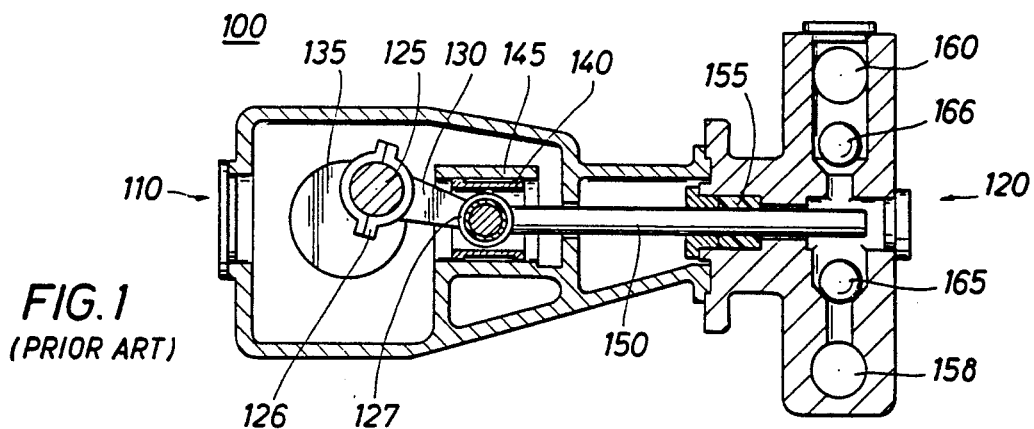
FIG. 1 depicts a prior art pump shown in section.

FIG. 1 depicts a prior art, reciprocating pump 100. The pump includes a power end 110 and a fluid end 120. The power end includes a crankshaft 135 (shown in section) having an offset portion or journal 125 which is connected to a first end 126 of a connecting rod 130. The first end 126 of connecting rod 130 is made of two pieces forming a circle with flanges that can be tightened around the crankshaft journal 125. Crankshaft 135 moves the first end 126 of connecting rod 130 in a circular motion.

At its second end 127, rod 130 is connected to crosshead 140. Crosshead 140 moves axially in a back-and-forth motion within cylinder 145. Extending from the fluid end 120 of crosshead 140 is plunger 150. As crosshead 140 reciprocates, plunger 150 moves axially through packing 155 and into the fluid end 120 of the pump 100 where it pressurizes fluid.

The fluid end 120 includes an input port 158 and an output port 160. Fluid enters port 158 and is prevented from moving back out port 158 by check valve 165. Plunger 150 acts to pressurize fluid and force it out of pump 100 through output port 160. Check valve 166 prevents pressurized fluid from returning into output port 160.

Figure 2:
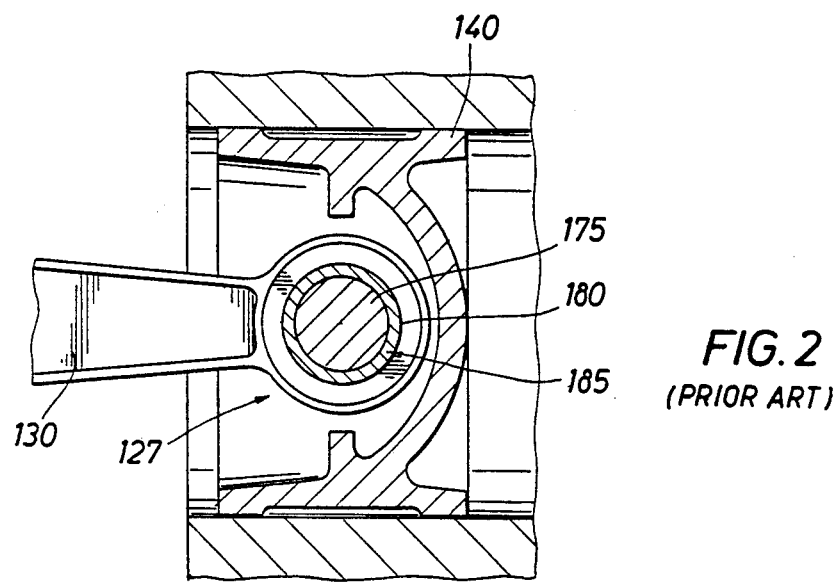
FIG. 2 depicts a knuckle joint of a prior art pump shown in section.

The present invention is concerned with the connection between rod 130 and crosshead 140. Prior art pumps utilize a wrist pin to connect the crosshead to the connecting rod. As shown in FIG. 2, wrist pin 175 (shown in section) extends from each side of the crosshead 140, through an aperture 180 in the second end 127 of rod 130. Between wrist pin 175 and aperture 180, a cylindrical bearing 185 transmits force between the pin 175 and rod 130. Because of the high pressures developed in the thrust portion of the pump cycle, bearing 185 tends to become flattened and deformed on the fluid side. In addition to thrust-induced wear, bearing 185 tends to wear unevenly from side to side because of misalignment between the crankshaft journal 125 and the wrist pin 175 (FIG. 1).

Figure 3:
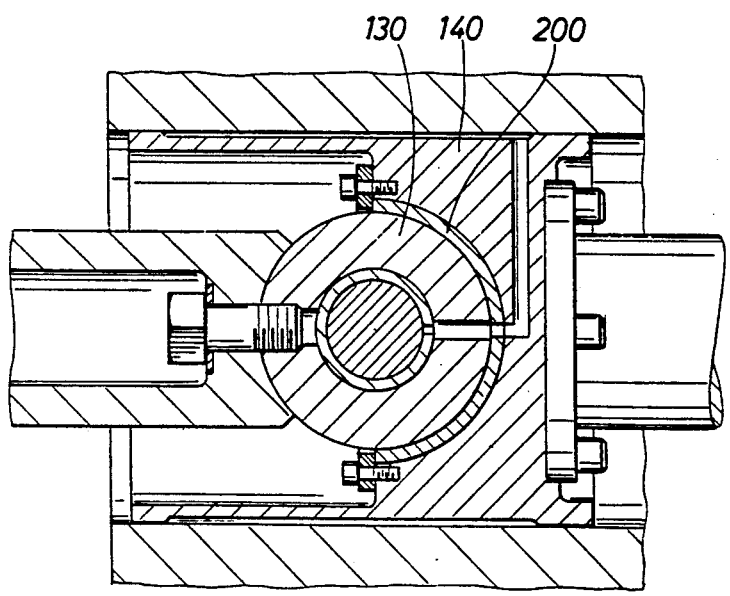
FIG. 3 is a prior art pump shown in section.

One way to increase bearing life is to increase bearing surface. In a typical 1600 horse power pump using a wrist pin bearing arrangement shown in FIG. 2, the bearing surface is about 11.5 square inches. As depicted in FIG. 3, a knuckle bearing 200 between the connecting rod 130 and the crosshead 140 can increase the bearing surface to about 24 square inches. While the knuckle bearing offers decreased wear, it is subject to the same stresses and deformation as the wrist pin bearing.

Figure 4:
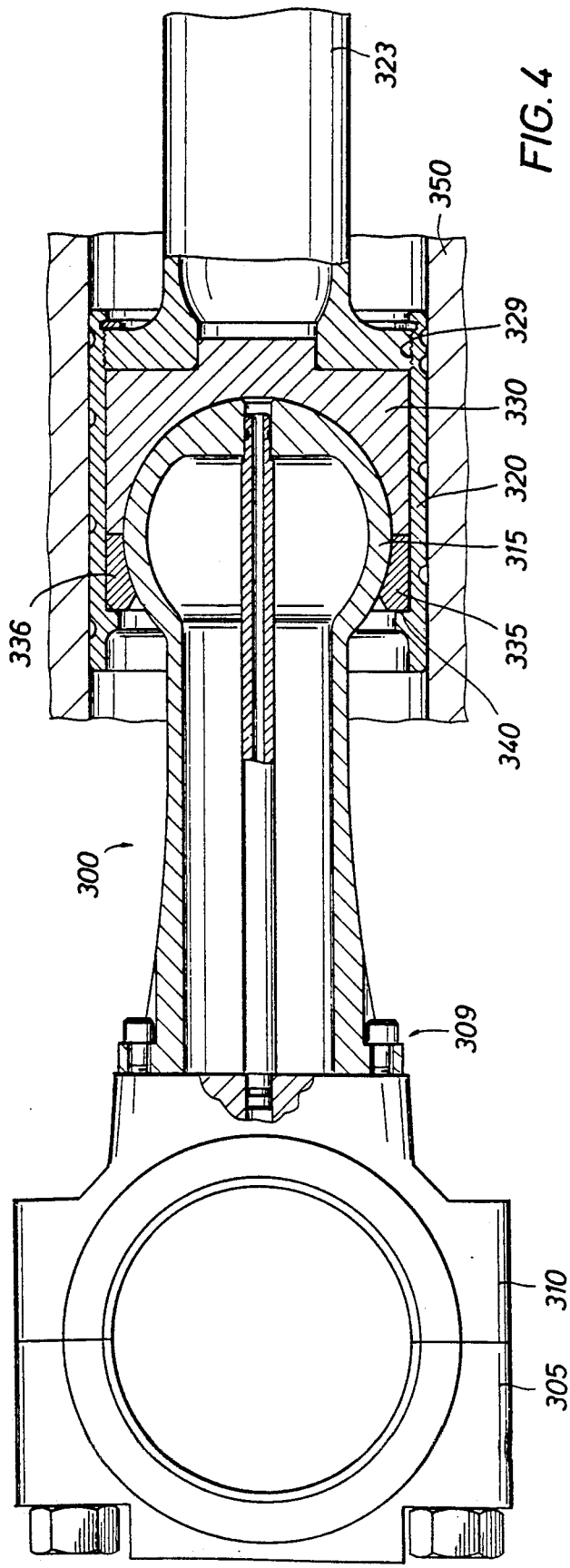
FIG. 4 is a section view of the pump which is the subject of the present invention.

The rod and bearing arrangement of the present invention is shown in FIG. 4. As in the prior art systems, the crankshaft end of the rod comprises a two-piece fitting 305, 310 which forms a circle around a crankshaft journal (not shown). For ease of assembly, the rod 300 of the preferred embodiment includes an additional connection point at 309. The end of rod 300 which attaches to the crosshead 320 forms a substantially spherical shape 315.

Thrust bearing 330, instead of having a cylindrical shape like prior art bearings, has a matching spherical interior which contains the forward end of spherical surface 315. Externally, thrust bearing 330 is cylindrical and matches the inside shape of crosshead 320. A two-piece retract bearing 335, 336 fits between the rear portion of sphere 315 and a shoulder 340 formed on the inside of crosshead 320.

In operation, the rod 300, bearings 335, 336, 330 and crosshead 320 move axially in cylinder 350. Crosshead extension 323, attached to the fluid end of crosshead 320 also moves axially into the fluid end of the pump. In a typical arrangement, a plunger (not shown) is connected to crosshead extension 323 and the plunger extends into the fluid end of the pump. However, a separate plunger and crosshead extension are not necessary for the operation of the present invention and the invention is not limited to use with any certain plunger/crosshead extension arrangement.

Figure 5:
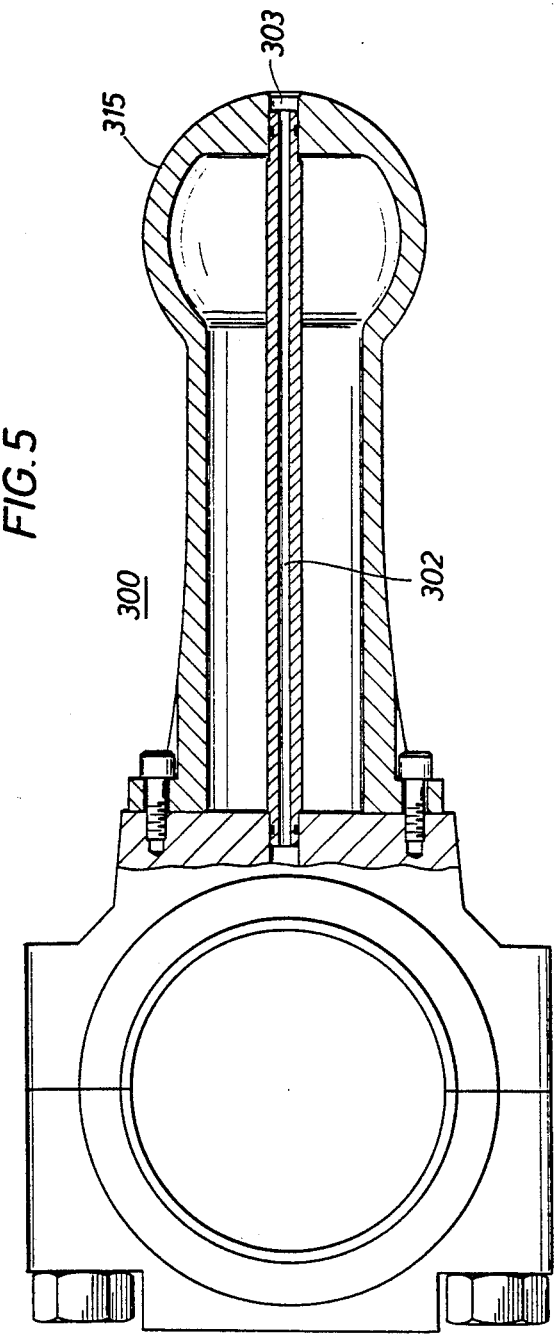
FIG. 5 depicts the rod housed within the pump of the present invention.

The rod assembly of the present invention can be further understood by reference to the individual pieces. FIG. 5 depicts the rod 300. In addition to the spherical shape 315, the rod 300 includes an internal lubrication channel 302 which runs down its center to an orifice 303. Lubricating fluid from orifice 303 lubricates the area between the spherical end 315 of rod 300 and the interior of thrust bearing 330.

Figure 6:
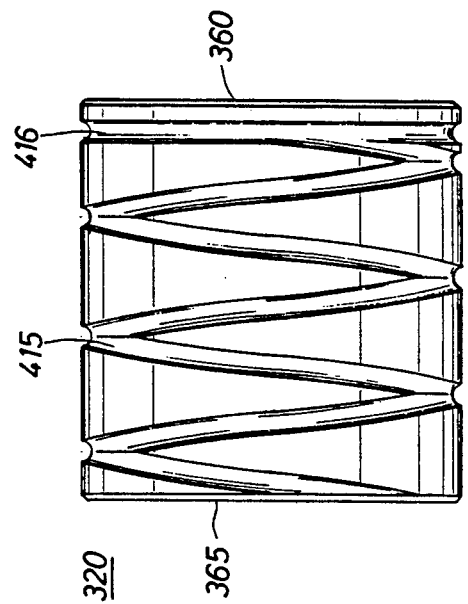
FIG. 6 is a side view of a cross-head having lubrication channels therein.

FIG. 6 is a side view of the crosshead 320. Crosshead 320 is designed to fit within cylinder 350 and has a cylindrical exterior which is open at both ends. The exterior surface of crosshead 320 is equipped with spiraling lubrication channels 415 which allow lubricant to travel between the crosshead 320 and the cylinder 350 as the crosshead reciprocates within the cylinder. Channels 415 are designed to allow lubrication fluid to enter at the rod end 365 and travel to the fluid end 360 of the crosshead 320. At the fluid end of the crosshead, lubrication channel 416 prevents lubrication fluid from continuing past the fluid end of the crosshead. The interior of crosshead 320 is substantially cylindrical with threads 329 at the fluid end 360 (FIG. 4) for insertion of crosshead extension 323. Also included is a shoulder 340 formed at the power end 365 of crosshead 320. The shoulder 340 provides a seat for retract bearings 335, 336.

Figure 8:
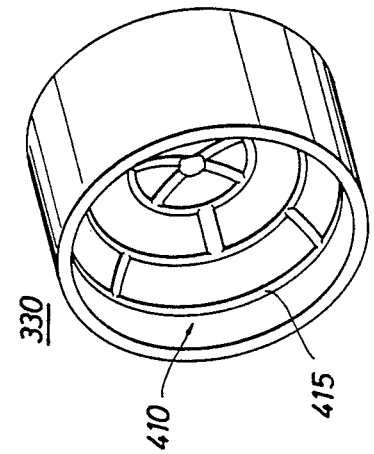
FIG. 8 is a perspective view showing the interior of the thrust bearing.
Figure 7:
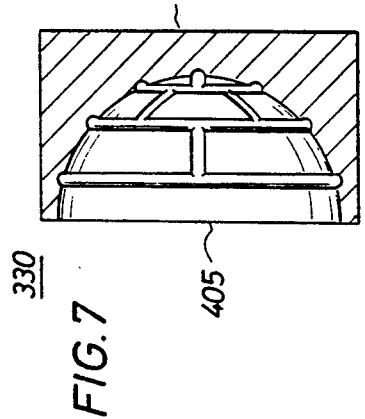
FIG. 7 is a side view of a thrust bearing partially in section.

Thrust bearing 330 can best be appreciated by reference to FIGS. 7 and 8. The exterior of the bearing forms a solid, cylindrical block with a closed end 400 and an open end 405. The interior 410 of the bearing 330 has a spherical shape designed to match the spherical shape 315 of rod 300. The interior 410 of bearing 330 can best be appreciated by reference to FIG. 8. In addition to having a spherical shape, the inside surface of bearing 330 includes lubrication channels 415. Lubrication channels 415 allow lubrication fluid to pass from rod orifice 303 to the area between the sphere 315 and the interior 410 of the bearing 330.

Figure 9:
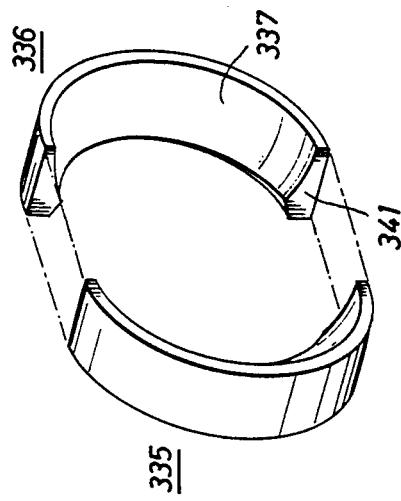
FIG. 9 is a perspective view of a two-piece retract bearing.

FIG. 9 depicts the two-piece retract bearing 335, 336. Retract bearings are deigned to fit between the rear portion of the spherical shape 315 of rod 300 and shoulder 340 Which is formed in the interior of crosshead 320 (FIG. 4). The interior surfaces 337 of retract bearings 335, 336 are curved to fit spherical shape 315. The base of the retract bearing matches shoulder 340 and the ends 341 fit together to create a circle. Both the thrust bearing 330 and the retract bearings 335,336 are made of bronze or similar bearing material.

To assemble the rod assembly of the present invention, the spherical end 315 of the rod 300 is extended through crosshead 320 towards the fluid end of the pump 100. The two-piece retract bearing is then inserted behind sphere 315 and the sphere is lowered towards the power end of pump 100 until retract bearings 335, 336 are held between the rear portion of sphere 315 and shoulder 340. Thrust bearing 330 is then loaded into the crosshead from the fluid end. Finally, crosshead extension 323 is threaded into the fluid end of crosshead 320 until thrust bearing 330 and retract bearing 335 are in metal-to-metal contact with shoulder 340 and crosshead extension 323. In the preferred embodiment, a split ring retainer holds the crosshead extension in place and prevents it from backing out of the crosshead 320.

The rod assembly of the present invention, with the spherical shape 315 and matching thrust bearing 330, increases the bearing surface between rod and bearing without enlarging the size of the fluid end of the pump. For instance, in the 1600 horse power pump, the bearing surface becomes about 39 square inches, a 49% increase over the bearing surface attainable with the current knuckle bearing. The increased bearing surface reduces the wear on the bearing and gives it a longer life. Additionally, the spherically shaped rod is self adjusting within the bearing to allow more even wear. The rod assembly of the present invention therefore, solves the problems of rapid bearing wear and misalignment and results in a reciprocating power pump which lasts longer and operates more efficiently.

While the rod assembly of the present invention has been described by reference to its preferred embodiment, it will be understood that other various embodiments of the device and method of the present invention may be possible by reference to the specification and the appended claims. Such additional embodiments shall be included within the scope of the appended claims.

I claim:

1. A connecting rod assembly for a reciprocating, single acting pump wherein a crosshead reciprocates within a cylinder, said rod assembly comprising:

a connecting rod, said connecting rod having a first end with means for connection to a crank shaft and a spherical end;

a thrust bearing, said thrust bearing constructed and arranged to be held in said crosshead, said thrust bearing having a cylindrical exterior and a substantially spherical interior, said substantially spherical interior constructed and arranged to house a forward portion of said spherical end of said connecting rod;

a retract bearing consisting of at least two, semicircular rings, said semicircular rings constructed and arranged to be housed in said crosshead and fit together forming a circle around a rear portion of said spherical end of said connecting rod;

a lubrication tube extending from said first end of said connecting rod and terminating in an orifice at said spherical end of said connecting rod, said tube having means for receiving lubricating fluid at said first end of said connecting rod whereby said fluid is delivered to said orifice; and a plurality of lubrication channels formed within said substantially spherical interior of said thrust bearing, said channels including a plurality of concentric circular grooves and at lease one groove communicating between each of said concentric grooves whereby lubrication fluid is communicated between said concentric grooves and between said spherical end of said connecting rod and said spherical interior of said thrust bearing.

2. A connecting rod assembly for a reciprocating, single acting pump wherein a crosshead reciprocates within a cylinder, said rod assembly comprising:

a connecting rod, said connecting rod having a first end with means for connection to a crank shaft and a spherical end;

a thrust bearing, said thrust bearing constructed and arranged to be held in said crosshead, said thrust bearing having a cylindrical exterior and a substantially spherical interior, said substantially spherical interior constructed and arranged to house a forward portion of said spherical end of said connecting rod;

a retract bearing consisting of at least two, semicircular rings, said semicircular rings constructed and arranged to be housed in said crosshead and fit together forming a circle around a rear portion of said spherical end of said connecting rod and;

a continuous of lubrication groove formed in the exterior surface of said crosshead, said groove forming a spiral shape around the perimeter of said crosshead and terminating in a non-spiraling groove at a second end of said crosshead whereby lubrication liquid is introduced at a first end of said crosshead but is prevented from extending past said second end of said crosshead.

* * * * *